United States Patent
Jaiswal et al.

(10) Patent No.: US 11,558,669 B2
(45) Date of Patent: Jan. 17, 2023

(54) DYNAMIC TAG-BASED PARENTAL CONTROL FOR MEDIA CONSUMPTION

(71) Applicant: International Business Machines Corporation, Armonk, NY (US)

(72) Inventors: Priyansh Jaiswal, Boca Raton, FL (US); Slobodan Sipcic, Bethesda, MD (US); Peeyush Jaiswal, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 16/811,099

(22) Filed: Mar. 6, 2020

(65) Prior Publication Data
US 2021/0281916 A1    Sep. 9, 2021

(51) Int. Cl.
H04N 21/454   (2011.01)
H04N 21/45    (2011.01)
H04N 21/258   (2011.01)
H04N 21/466   (2011.01)
H04N 21/25    (2011.01)

(52) U.S. Cl.
CPC ......... *H04N 21/454* (2013.01); *H04N 21/252* (2013.01); *H04N 21/25891* (2013.01); *H04N 21/4532* (2013.01); *H04N 21/4662* (2013.01)

(58) Field of Classification Search
CPC .............. H04N 21/454; H04N 21/252; H04N 21/25891; H04N 21/4532; H04N 21/4662
See application file for complete search history.

(56) References Cited

U.S. PATENT DOCUMENTS

| | | | |
|---|---|---|---|
| 6,449,766 B1 | 9/2002 | Fleming | |
| 8,001,561 B2 | 8/2011 | Gibbs et al. | |
| 8,141,114 B2 | 3/2012 | Conradt et al. | |
| 8,949,878 B2 | 2/2015 | Dimitrova et al. | |
| 9,286,617 B2 | 3/2016 | Maskatia et al. | |
| 10,088,983 B1 * | 10/2018 | Qaddoura | H04N 21/23439 |
| 10,200,734 B2 | 2/2019 | Sharma | |
| 2001/0001159 A1 * | 5/2001 | Ford | H04N 7/088 725/25 |
| 2003/0115592 A1 | 6/2003 | Johnson | |
| 2008/0222673 A1 * | 9/2008 | Durden | H04N 7/165 725/25 |
| 2009/0133089 A1 * | 5/2009 | Ku | H04N 21/4751 725/131 |
| 2011/0321080 A1 * | 12/2011 | Durden | H04N 21/2543 725/28 |

(Continued)

*Primary Examiner* — Nnenna N Ekpo
(74) *Attorney, Agent, or Firm* — Cantor Colburn LLP; Tihon Poltavets

(57) ABSTRACT

A method for dynamic content filtering includes accessing, by a processing unit, a media content that includes several content portions. The method further includes determining a rating tag associated with each content portion from the media content, and a user profile of a user requesting the media content to be rendered. The user profile contains a permission level for the user. The method further includes filtering the content portions from the media content based on the permission level, wherein, in response to the rating tag of a particular content portion exceeding the permission level in the user profile, filtering out the particular content portion. The method further includes rendering content portions that were not filtered out.

20 Claims, 9 Drawing Sheets

(56) References Cited

U.S. PATENT DOCUMENTS

| | | | |
|---|---|---|---|
| 2012/0084805 A1* | 4/2012 | Barnes, Jr. | H04W 4/18 |
| | | | 725/28 |
| 2012/0311625 A1* | 12/2012 | Nandi | H04N 21/45457 |
| | | | 725/28 |
| 2015/0070516 A1 | 3/2015 | Shoemake et al. | |
| 2018/0376204 A1* | 12/2018 | Oswal | G02B 27/0172 |

* cited by examiner

DYNAMIC TAG-BASED PARENTAL CONTROL FOR MEDIA CONSUMPTION

BACKGROUND

The present invention relates to computing technology, and particularly to filtering sections of electronic media content for specific users.

Presently, media content is rated by external committee(s), not a content provider, in accordance with a static rating system. Typically, the rating system uses age recommendations in an advisory or restrictive capacity ranging up to adulthood, and are often given to aid censorship of the content. Additionally, most content delivery services support some type of parental control defined at a coarse-level (e.g., application level, site level, etc.).

SUMMARY

According to one or more embodiments of the present invention, a method for dynamic content filtering includes accessing, by a processing unit, a media content that includes several content portions. The method further includes determining a rating tag associated with each content portion from the media content, and a user profile of a user requesting the media content to be rendered. The user profile contains a permission level for the user. The method further includes filtering the content portions from the media content based on the permission level, wherein, in response to the rating tag of a particular content portion exceeding the permission level in the user profile, filtering out the particular content portion. The method further includes rendering content portions that were not filtered out.

A system, according to one or more embodiments of the present invention, includes a content rendering device, and a content server. The system performs a method for dynamic content filtering includes accessing, by a processing unit, a media content that includes several content portions. The method further includes determining a rating tag associated with each content portion from the media content, and a user profile of a user requesting the media content to be rendered. The user profile contains a permission level for the user. The method further includes filtering the content portions from the media content based on the permission level, wherein, in response to the rating tag of a particular content portion exceeding the permission level in the user profile, filtering out the particular content portion. The method further includes rendering content portions that were not filtered out.

According to one or more embodiments of the present invention, a computer program product includes a memory storage device having computer executable instructions stored thereon. The computer executable instructions when executed by one or more processing units cause the one of more processing units to perform a method for censoring portions of media. The method for dynamic content filtering includes accessing, by a processing unit, a media content that includes several content portions. The method further includes determining a rating tag associated with each content portion from the media content, and a user profile of a user requesting the media content to be rendered. The user profile contains a permission level for the user. The method further includes filtering the content portions from the media content based on the permission level, wherein, in response to the rating tag of a particular content portion exceeding the permission level in the user profile, filtering out the particular content portion. The method further includes rendering content portions that were not filtered out.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

Exemplary embodiments of the present invention provide a dynamic individualized content rating system based on selection(s) made by a particular set of users, such as a family. Embodiments of the present invention further facilitate real time feedback and configuration of content delivery at a granular level. The technical solutions provided by embodiments of the present invention not only complement, but extend the present static content rating system, and accordingly provide an improvement to the present content rating system. Further, embodiments of the present invention improve computing technology that facilitates playback of media content by facilitating content rendering devices to implement such a dynamic content rating system that filters particular sections/portions of content from a requested media.

Figure 1:
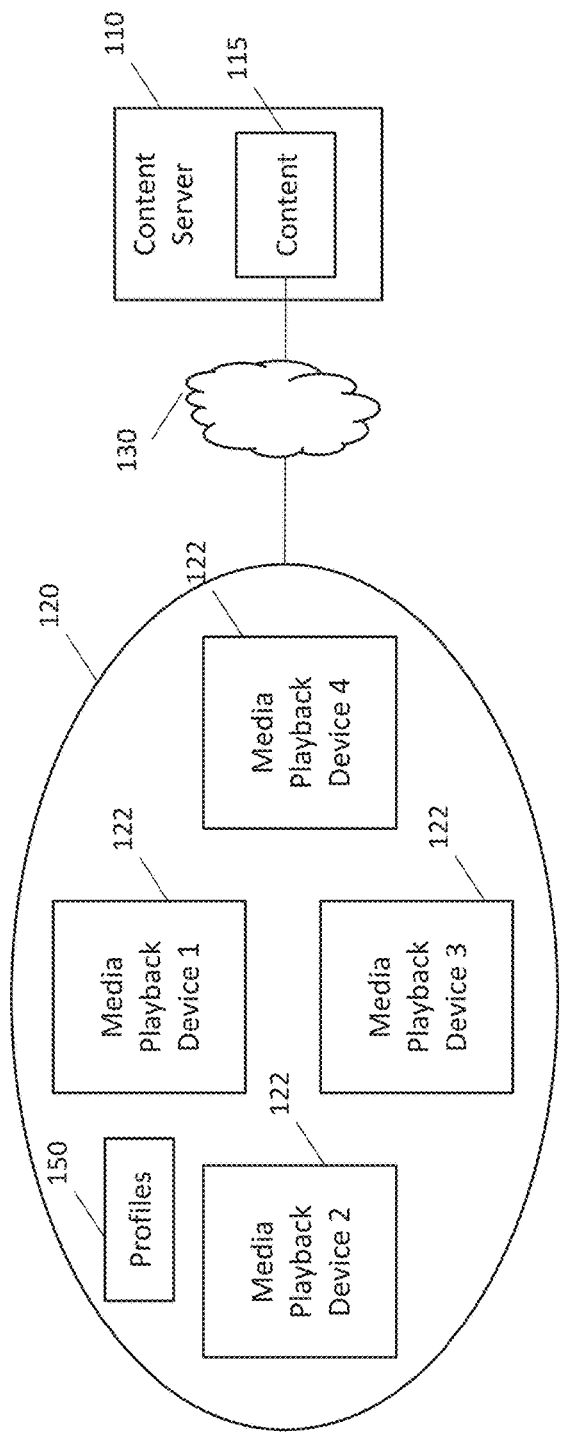
FIG. 1 depicts a block diagram of a system for dynamic tag-based parental control for media consumption according to one or more embodiments of the present invention.

FIG. 1 depicts a block diagram of a system for dynamic tag-based parental control for media consumption according to one or more embodiments of the present invention. The system 100 includes a content server 110 that provides media content 115 to content rendering devices 122. Here, a "media content" can include several types of content such as an image, an audio, a video, a webpage, a game, or any other types of content or a combination thereof. The content server 110 can includes multiple media contents 115, although only one is depicted in FIG. 1.

The content rendering devices 122 can access and render the media content 115 from the content server 110 via a communication network 130. The communication network 130 can be any type of network such as Ethernet, 3G, 4G, 5G, or any other type of network or a combination thereof. The communication network 130 can be a wired or a wireless network. The communication network 130 can use one or more communication protocols, such as transmission control protocol/internet protocol (TCP/IP), Hypertext Transfer Protocol (HTTP), file transfer protocol (FTP), user datagram protocol (UDP), etc. to facilitate the content rendering devices 122 to send/receive data to/from the content server 110. Other types of communication networks and communication protocols can be used in one or more embodiments of the present invention without limiting the technical solutions provided.

Each content rendering device 122 is a computing device that is capable of displaying the media content 115. Displaying the media content 115 can include playing back video, audio, augmented reality content, virtual reality content, etc., or a combination thereof. Displaying the media content 115 can further include displaying images, text, hyperlinks, and other such types of content. Further, the content rendering device 122 can execute scripts, programs, and other such content to facilitate displaying portions of the media content 115.

Each of the content rendering devices 122 can be part of a group of devices that are managed together, for example, as a family, a business, an institution, or any other such group. Each content rendering device 122 can have a designated user profile, where only a user that is associated with that user profile can access that particular content rendering device 122. Alternatively, or in addition, a user from the group can access any content rendering device 122 with his/her credentials, and thereby associating his/her user profile with that content rendering device 122. The user can then logout and disassociate his/her user profile from the content rendering device 122.

In one or more embodiments of the present invention, the user profiles 150 associated with each of the users in the group are stored such that the content rendering device 122 can access the user profiles 150. For example, the user profiles 150 are stored on one of the content rendering devices 122 and are accessible to the other content rendering devices 122. Alternatively, or in addition, the user profiles 150 are stored in a separate device, such as a network gateway, a network attached storage, or any other device that is accessible from each of the content rendering devices 122.

Each user profile 150 provides a permission level that determines whether the corresponding user can view media content of a particular rating level. The content rendering device 122 compares the permission level with rating tags that are included in the media content 115. In one or more embodiments of the present invention, the media content 115 includes an overall rating tag that indicates an overall content rating for the media content 115. In addition, the media content 115 is divided into one or more portions/sections. Each portion has a corresponding rating tag that indicates a content rating for that particular content portion. Based on the comparison, the content rendering device 122 filters (or alternatively renders) one or more portions of the media content 115 depending on the user profile 150 that is presently active on the content rendering device 122, active user profile indicative of the user that is logged in to the content rendering device 122. In one or more embodiments of the present invention, "filtering" a portion can include replacing that portion with another alternative portion. For example, the content server 130 can identify an alternative content that can be used in place of the filtered portion. Alternatively, or in addition, the content rendering device 122 stores one or more media content that can be used to replace the filtered content portion.

Figure 2:
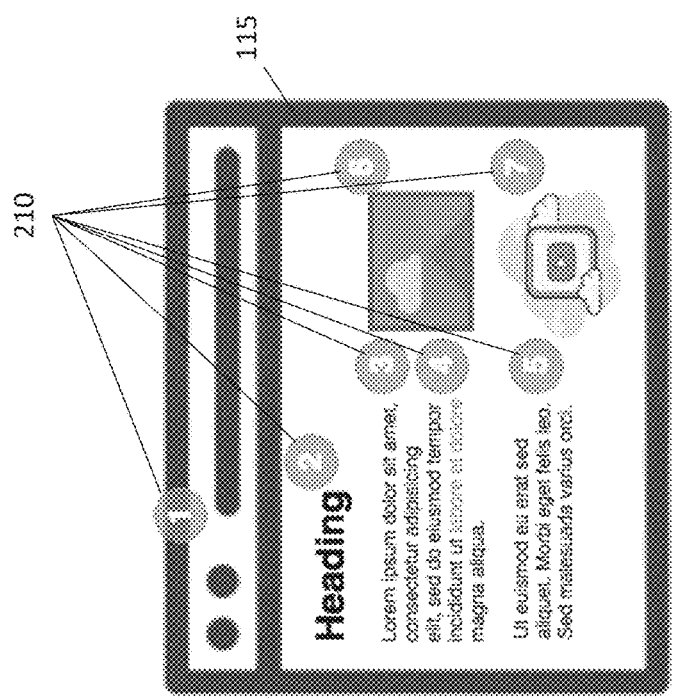
FIG. 2 depicts an example media content according to one or more embodiments of the present invention.

FIG. 2 depicts an example media content according to one or more embodiments of the present invention. Throughout the present application example operations of one or more embodiments of the present invention are described using the depicted example in which the media content 115 is a website that includes multiple dynamically generated webpages that include content rating tags 210. The content rating tags 210 complement the existing static ratings defined by content-providers, for example, G—General Audience; PG—Parental Guidance Suggested; PG-13—Inappropriate for children under 13; R—Inappropriate for children under 17; NC-17—Adults Only, and the like. It is understood that embodiments of the present invention are not limited to webpages as the media content 115, and that the media content 115 can include other types of content such as audio, video, images, and the like, or a combination thereof.

In the depicted example in FIG. 2, the media content 115 is tagged at a granular level including, the overall website—URL (1), pages (2), text portions (3) and (5), hyperlinks (4), images (6), and media (7). In other examples, the media content 115 can include additional portions (not shown) that are tagged, for example, advertisements, input boxes, etc.

Further, consider that in an example scenario the group 120 of users is a hypothetical family of five: Mother, Father, John—8 years old, Jane—14 years old, and Mary—18 years old. Each of these users has a profile 150. Further, in this example, Mother and/or Father have administrative privileges to edit/configure user profiles 150 of other users, however, other users, i.e. John, Jane, and Mary, cannot change the user profiles of Mother and Father. In one or more embodiments of the present invention, Mother/Father can allow a user to edit their own user profile 150. For example, Mary, who is 18, may be allowed to update her own user profile 150.

Figure 3:
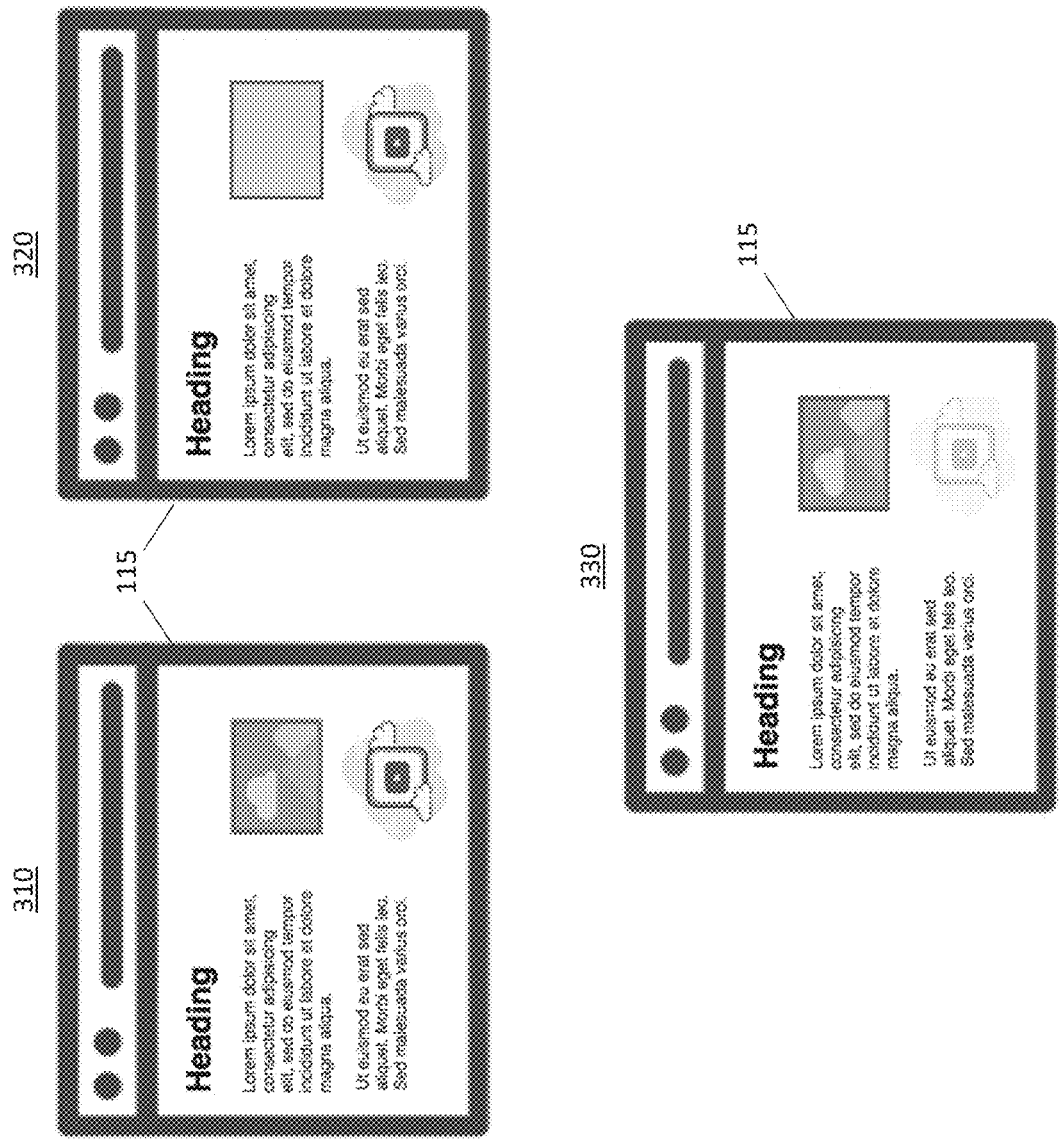
FIG. 3 depicts different views of a media content based on a user profile being used according to one or more embodiments of the present invention.

FIG. 3 depicts different views of a media content based on a user profile being used according to one or more embodiments of the present invention. The views in FIG. 3 are a result of using the technical solutions described herein. As shown in view 310, Mother and Father may have unrestricted access and they would see the full content of the media content 115, irrespective of the rating tags 210 (see FIG. 2). If the overall rating tag 210 of the website is rated as say, PG-13 and the parental control in the user profiles 150 is set age-appropriately only John is not be able to access the website. Further, using the user profiles 150, the parents can request filtering one or more portions of the website based on the rating tags 210 of the several portions in the media content 115 in order to define more granular access for Jane and Mary. For example, table 1 provides an example granular filtering via the user profiles 150 of Jane and Mary.

TABLE 1

| Tagged Content | Preview Content | Allow | Disallow |
| --- | --- | --- | --- |
| Site | NA | Default | |
| Page "Header" | <link to the page> | Jane Mary | |
| Paragraph (3) | Lorem ipsum dolor sit amet, consectetur adipisicing elit, sed do eiusmod tempor incididunt ut labore et dolore magna aliqua. | Jane Mary | |
| Hyperlink "labore et dolore" | Hyperlink to <labore et dolore> | Mary | Jane |
| Paragraph (5) | Ut euismod eu erat sed aliquet. Morbi eget felis leo. Sed malesuada varius orci. | Jane Mary | |
| Image (6) | <link to image> | Mary | Jane |
| Media (7) | <link to movie> | Jane | Mary |

In one or more embodiments of the present invention, the parent(s) can view a map of the media content 115 upon request. In one or more embodiments of the present invention the parent(s), who have an administrator role in this example, are associated with a master user profile 150. The users of the master user profile, i.e., administrators, have unlimited access to the content 115. That is all the portions are rendered for users with the master profile, and no filtering is performed in this case. The map can be a list of one or more portions in which the media content 115 is divided. For example, in the case of the website, a site-map can be the map. In other cases, for example, a video, the map can be a list of one or more sets of frames from the video, where each set of frames represents a particular content portion in the video. A content creator/provider can divide the media content 115 into one or more portions and tag each portion appropriately. The content creators/providers can be incentivized to provide such divisions, and tagging of content in order to reach broader audience, for example, by blocking any untagged portions and/or any undivided media content 115.

Alternatively, or in addition, the parents can add dynamic tags 210 to one or more portions of the media content 115, such dynamic tags being specific to the group 120. For example, the dynamic tags 210 can be stored in the user profiles 150 for the specific media content 115. Alternatively, or in addition, the dynamic tags 210 for the specific content 115 and for the specific users are stored in the content rendering devices 122.

Alternatively, or in addition, parents can update the dynamic tags 210 of the media content 115 in the content server 110. In this case, the dynamic tags 210 can be used by other groups of users, such as a second family that uses the tags 210 to filter out portions of the media content 115. For example, based on the configuration shown in table 1, when Jane accesses the website, her view is as shown in view 320. As can be seen, Jane does not have access to the hyperlink <labore et dolore> and the image. Similarly, when Mary access the website her view will be as depicted in view 330. Here, the hyperlink is accessible, but the link to the media is not accessible. In one or more embodiments of the present invention, "filtering" a portion can include replacing that portion with another alternative portion. For example, the content server 130 can identify an alternative content that can be used in place of the filtered portion. Alternatively, or in addition, the content rendering device 122 stores one or more media content that can be used to replace the filtered content portion. In the above example scenario, the hyperlink can be replaced with text, for example. Further, the image can be replaced with another image that the content server 130 (or the content rendering device 122) have stored as a replacement image. In one or more embodiments of the present invention, the replacement content (e.g., image) can be a generic content (e.g., generic image) that replaces any filtered portion of that type (e.g., image, text, video, audio etc.). Alternatively, or in addition, the content provider/generator can store separate content portions appropriate for particular rating tags 210. The content rendering device 122 can, accordingly, replace the filtered content portion with the content that is marked with the particular user's permission level.

Figure 4:
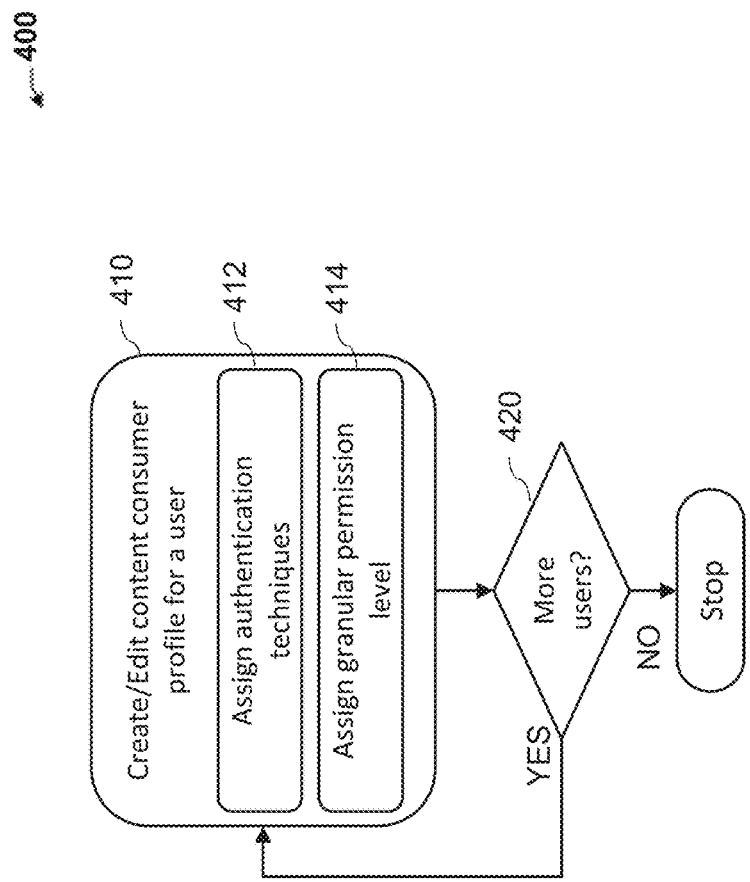
FIG. 4 depicts a flowchart of a method for creating a content consumer profile and for assigning content-access permissions (or restrictions) based on customized ratings according to one or more embodiments of the present invention.

FIG. 4 depicts a flowchart of a method for creating a content consumer profile and for assigning content-access permissions (or restrictions) based on customized ratings according to one or more embodiments of the present invention. The method 400 can be performed by an administrator of the group 120 of users. In the example scenario described herein, the parent(s) can be the administrator. In other examples, the administrator can be a team of personnel that manage information-technology at an organization, such as a business.

The method 400 includes creating a user profile 150 for each content consumer in the group 120, at block 410. In one or more embodiments of the present invention, the user profiles 150 are created separately for each consumer. The user profile 150 is created, in one or more embodiments of the present invention, using a user-interface of the media-playback device 122. The user profile 150 is assigned one or more authentication techniques, at block 412. The authentication techniques can include username/password, biometrics, two-step authentication, and any other techniques. The user can use one of the assigned authentication techniques to activate that user profile 150. In one or more embodiments of the present invention, the content rendering devices 122 may not operate without having an active user profile 150. In one or more embodiments of the present invention, a user has to activate the user profile 150 at startup of the content rendering device 122. Alternatively, or in addition, each user may have an assigned content rendering device 122, and the corresponding user profile 150 is stored on that content rendering device 122.

Further, each user profile 150 is assigned granular, customized permission level, at block 414. In one or more embodiments of the present invention, the user profile 150 includes permission levels for specific rating tags 210. The customized permission levels can be rule-based or pattern-based. For example, based on the demographic information for the user, such as age, gender, location, etc., the permission levels can be automatically set/updated. In one or more embodiments of the present invention, each user profile 150 includes the types of content rating tags 210 that the user can (and/or cannot) view.

Figure 5:
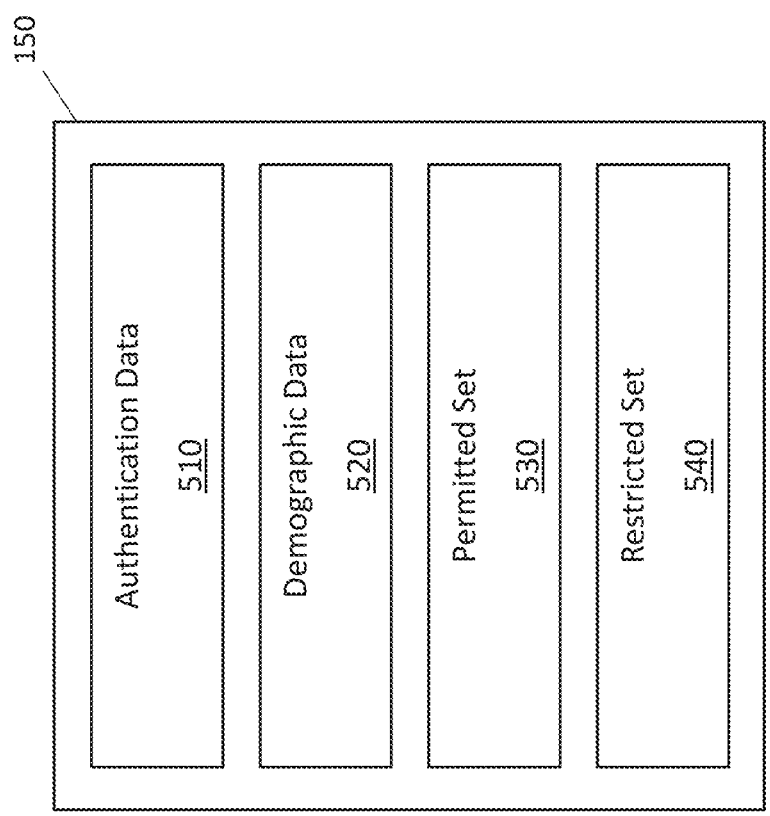
FIG. 5 depicts an example user profile according to one or more embodiments of the present invention.

FIG. 5 depicts an example user profile according to one or more embodiments of the present invention. The user profile 150 includes one or more authentication data 510 for the user associated with the user. In one or more embodiments of the present invention, the user profile 150 includes demographic data of the user, for example, age, name, gender, and the like. Further, the user profile 150 includes a permitted set 530 of rating tags 210 that the user can view. In one or more embodiments of the present invention, the user profile 150 includes a restricted set 540 of rating tags 210 that the user cannot view. It should be noted that in one or more embodiments of the present invention, the user profile 150 can include one or the other of the two, permitted set 530 and restricted set 540. Alternatively, in one or more embodiments of the present invention, the user profile 150 can include both, the permitted set 530 and the restricted set 540. Additional information can also be stored in the user profile 150.

The user profiles 150 and associated ratings are persisted on a storage device that can be accessed by the content rendering devices 122. For example, the user profiles 150 are stored in a network attached storage/server or any other storage. In one or more embodiments of the present invention, the user profiles 150 are stored on one or more content rendering devices 122 accessible by each of the content rendering devices 122.

Referring back to FIG. 4, the method 400 further includes determining if additional user profiles 150 are to be created or edited, at block 420. In such a case, a user profile 150 is created or edited as described herein. Alternatively, the method 400 ends.

Figure 6:
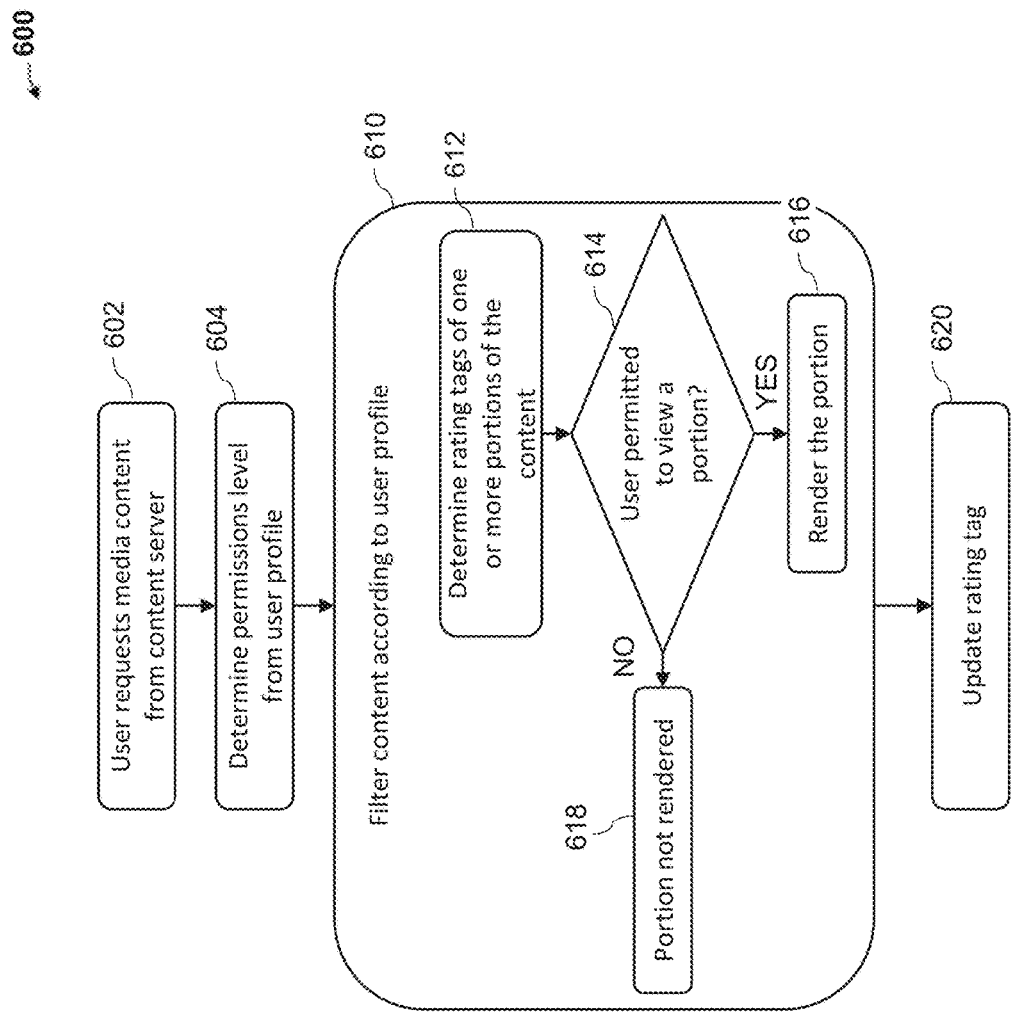
FIG. 6 depicts a flowchart for a method for accessing media content using content rendering devices according to one or more embodiments of the present invention.

FIG. 6 depicts a flowchart for a method for accessing media content using content rendering devices according to one or more embodiments of the present invention. The method 600 includes requesting, by the user of a content rendering device 122, the content 115 from the content server 110, at block 602. The content rendering device 122 determines the permissions levels of the user from user profile 150 of the user, at block 604. The user profile 150 is accessed based on the user authentication when logging in to the content rendering device 122.

The method 600 further includes filtering one or more portions of the content 115 based on the permission levels in the user profile 150, at block 610. The filtering can include accessing the rating tags 210 of the portions of the content 115, at block 612. Each portion of the content 115 can include one or more rating tags 210. The rating tags 210 are associated with each portion of the content 115 by the content provider and/or the content generator. In addition, the rating tags 210 can be a result of feedback received from other users as is described herein.

Further, the filtering includes comparing the rating tags 210 of each portion with the permission level from the user profile 150, at block 614. If the rating tag 210 of a portion exceeds the permission level, the portion is permitted to be viewed by the user, and accordingly, is rendered by the content rendering device 122, at block 616. Alternatively, if the user is restricted from viewing the portion, the content rendering device 122 does not render the portion, at block 618. In one or more embodiments of the present invention, if a portion is associated with an empty/blank rating tag 210, the portion is not rendered by default. This incentivizes content generators to tag all the portions of the content 115 so that maximum users can view their content. Further yet, in one or more embodiments of the present invention, comparing the rating tags 210 includes comparing the overall tag of the content 115 with the permission level. If the user is not allowed to view content with the overall rating itself, the rating tags 210 of individual portions of the content 115 are not checked. Instead, the entire content 115 is not rendered.

The filtering can be performed by the content rendering device 122 in one or more embodiments of the present invention. In this case, the content server 110 sends, to the content rendering device 122, along with the portion of the content, the rating tag 210 of that portion. The content rendering device 122, subsequently performs the determination as described above.

Alternatively, or in addition, the content server 110 filters the portions of the content 115 in one or more embodiments of the present invention. For example, the content rendering device 122 sends to the content server 110, along with the request to access the content 115, the permitted set 530, the restricted set 540, or both. The content server 110 can transfer, to the content rendering device 122, only the portions of the content 115 that are to be rendered. This can facilitate the content rendering device 122 to use lesser network bandwidth, because only the filtered content portions are transferred on the network 130. Accordingly, the technical solutions can provide additional technical improvements by improving network efficiency of the system 100.

The filtering and rendering continues until all of the portions of the content 115 are processed, i.e., either rendered or determined to not be rendered. Accordingly, the method 600 facilitates filtering content 115 at real time.

Further yet, the method 600 includes updating, by the user, a rating tag 210 of a portion of the content 115, at block 620. For example, if the user wants to provide a feedback that the rating tag 210 that is presently associated with a portion, or the overall content 115, is incorrect, the user can update the present rating tag 210 with a new rating tag 210. In one or more embodiments of the present invention, the user sends the new rating tag 210 to the content server 110 to associate the new rating tag 210 with the portion or the overall content 115. Along with the new rating tag 210, the content rendering device 122, sends a portion-identifier/time-point of the content 115 that the user is presently viewing. Accordingly, the content server 110 can associate the new rating tag 210 with the appropriate portion of the content 115.

In one or more embodiments of the present invention, the new rating tag 210 is stored with the user profiles 150. The stored new rating 210 is also accessible to the content rendering devices 122 from the group 120. The content rendering device 122 uses the stored rating tag 210 instead of the rating tag 210 retrieved from the content server 110 in this case. In the case where the content server 110 filters the portions of the content 115, the stored new tag(s) 210 for the specific group 120 are also sent to the content server 110 for accurate filtering.

Figure 7:
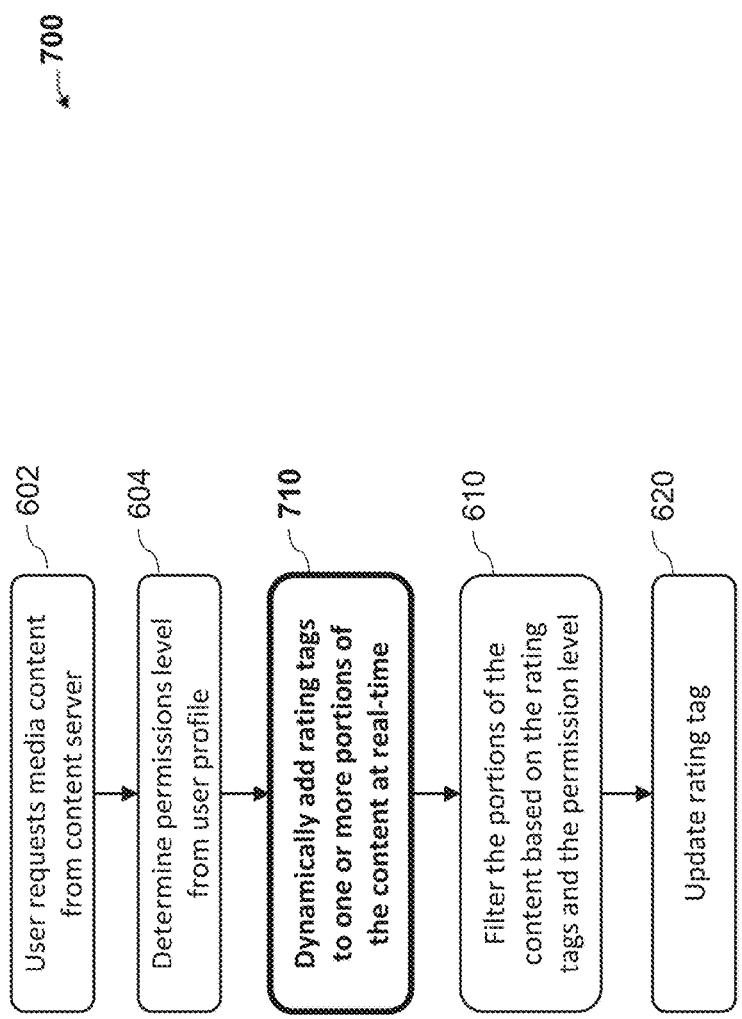
FIG. 7 depicts a flowchart of another method for accessing media content using content rendering devices according to one or more embodiments of the present invention.

FIG. 7 depicts a flowchart of another method for accessing media content using content rendering devices according to one or more embodiments of the present invention. The method 700 includes the operations described earlier of user requesting the media content 115 from the content server 110, at block 602. Further, the method 700 includes determining the permission level for the user from the corresponding user profile 150 of the user, at block 604. Further, the method 700 includes tagging the one or more portions of the content 115 in real-time, at block 710.

The real-time tagging includes associating one or more rating tags 210 to the one or more portions in the content 115 automatically. In one or more embodiments of the present invention, an image processing analysis is performed of any images in the content 115. The image processing analysis determines if any images contain any material that exceeds the permission level from the user profile 150. For example, if the image includes adult material, the image is assigned a rating tag 210 representing the "R" or "NC-17" rating. Accordingly, the image is marked as not suitable for Jane and/or John from the example family described herein. Similarly, the real-time tagging includes analyzing videos, text, audio, and other types of media. The analysis can be performed using machine learning techniques, neural networks, and other such automated techniques that are presently known or will be developed in the future. The real-time tagging can be performed by the content server 110 in one or more embodiments of the present invention. Alternatively, or in addition, the content rendering device 122 performs the real-time tagging.

The method 700 further includes filtering the one or more portions of the content 115 based on the rating tags 210 and the permission level from the user profile 150, at block 610. The filtering is described in detail earlier, and is not repeated. Further, the method 700 includes allowing the user to update the rating tag(s) 210 of the content 115 as described herein, at block 620.

Accordingly, embodiments of the present invention address the technical challenges of static content rating and provide an improvement by facilitating dynamic content rating that is particular to a group of users. Accordingly, different groups of users can have customized dynamic content rating permissions for individual users. For example, in the example family of five described earlier, Jane, who is 14 years old, is not allowed to view certain content from the website in view 320 (FIG. 3). Using embodiments of the present invention, in another family a 14 year old Grace may be permitted to view the content that Jane is restricted from. Accordingly, if Grace's parents (or administrator of her network) can set the permission level for Grace so that she is permitted to view such content.

Figure 8:
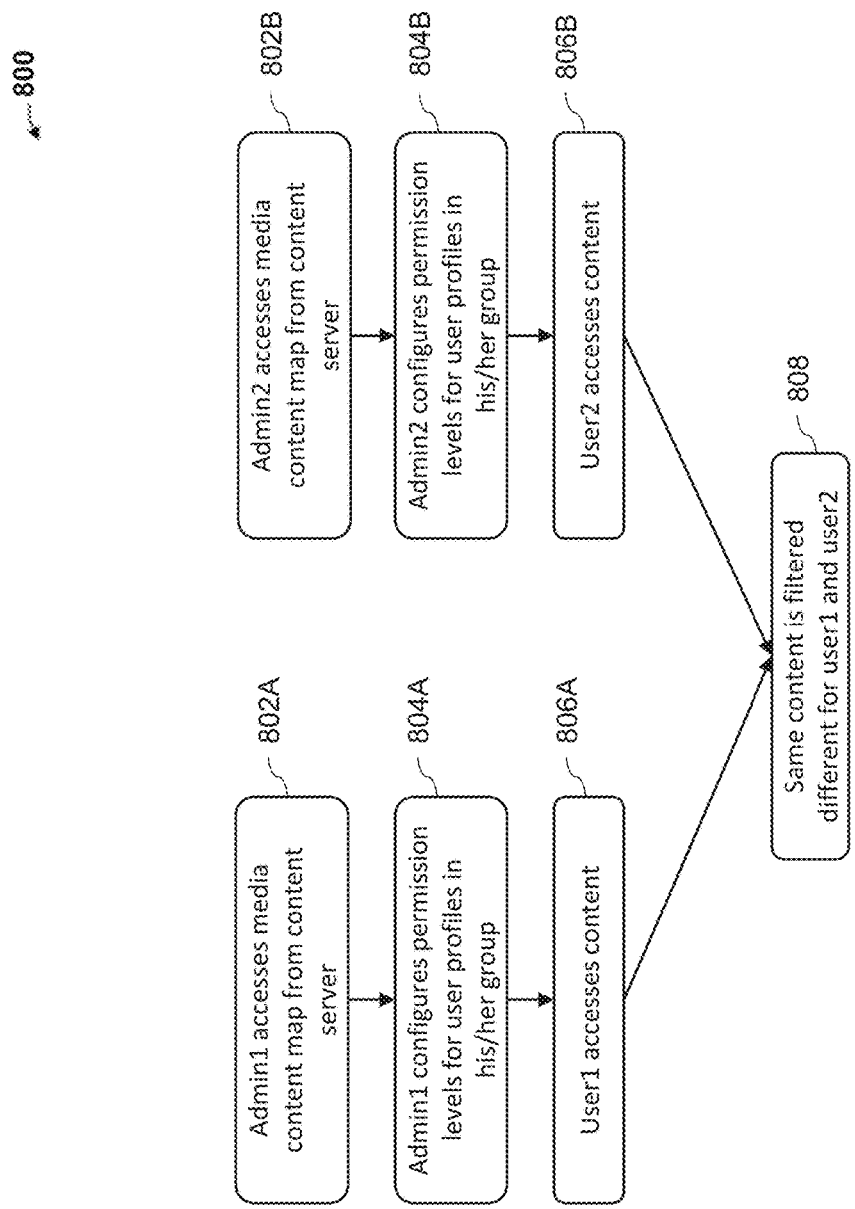
FIG. 8 depicts a flowchart of a method for filtering content based on customized rating according to one or more embodiments of the present invention.

FIG. 8 depicts a flowchart of a method for filtering content based on customized rating according to one or more embodiments of the present invention. The method 800 includes administrators of respective user groups 120 requesting a content map for the content 115 from the content server 110, at blocks 802A and 802B. It should be noted that both administrators are seeking information about the same content 115. The two groups can be two distinct families, and administrators can be a parent from those respective families. The content map can be a list of the portions in the content 115, a site-map, etc. The content map can be similar to the first three columns in table 1. A name of each portion and a preview of each portion may be shown to the administrators.

The administrators, respectively, configure user profiles 150 from their respective groups 120, at blocks 804A and 804B. For example, consider that the first group 120 is the hypothetical family described earlier. A first administrator from the first group configures the user profile 150 for Jane (14 year old) so that she cannot view the image and hyperlink as noted in table 1. In the second group, say Grace's family, a second administrator sets up Grace's user profile 150 so that she can view the image, but not the hyperlink. Accordingly, when the users, in this case Jane and Grace, access the content 115, the portions of the content 115 are filtered in different ways for each of them, at blocks 806A, 806B, and 808. In the above example, Jane is blocked from the image and hyperlink, while Grace can view the image, but cannot access the hyperlink. The filtering can be performed by the content rendering devices 122 used by Jane and Grace, respectively, in one or more embodiments of the present invention. Alternatively, the content server 110 filters the portions in one or more embodiments of the present invention.

Figure 9:
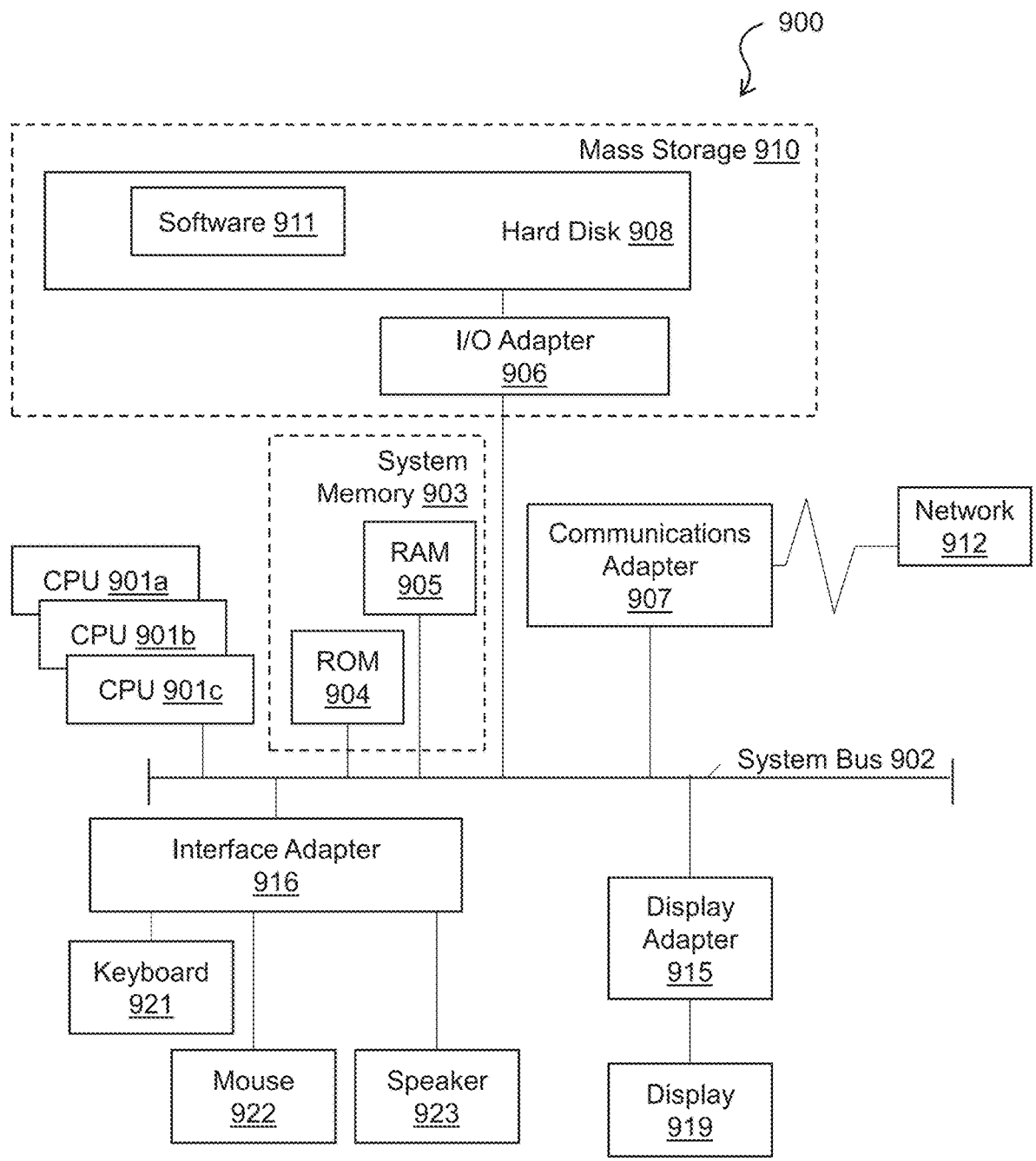
FIG. 9 depicts a block diagram of a computing system that can implement one or more embodiments of the present invention.

Any of the components depicted in FIG. 1 (or other figures) can be a computer system in one or more embodiments of the present invention. Turning now to FIG. 9, a computer system 900 is generally shown in accordance with an embodiment. The computer system 900 can be an electronic, computer framework comprising and/or employing any number and combination of computing devices and networks utilizing various communication technologies, as described herein. The computer system 900 can be easily scalable, extensible, and modular, with the ability to change to different services or reconfigure some features independently of others. The computer system 900 may be, for example, a server, desktop computer, laptop computer, tablet computer, or smartphone. In some examples, computer system 900 may be a cloud computing node. Computer system 900 may be described in the general context of computer system executable instructions, such as program modules, being executed by a computer system. Generally, program modules may include routines, programs, objects, components, logic, data structures, and so on that perform particular tasks or implement particular abstract data types. Computer system 900 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system 900 has one or more central processing units (CPU(s)) 901a, 901b, 901c, etc. (collectively or generically referred to as processor(s) 901). The processors 901 can be a single-core processor, multi-core processor, computing cluster, or any number of other configurations. The processors 901, also referred to as processing circuits, are coupled via a system bus 902 to a system memory 903 and various other components. The system memory 903 can include a read only memory (ROM) 904 and a random access memory (RAM) 905. The ROM 904 is coupled to the system bus 902 and may include a basic input/output system (BIOS), which controls certain basic functions of the computer system 900. The RAM is read-write memory coupled to the system bus 902 for use by the processors 901. The system memory 903 provides temporary memory space for operations of said instructions during operation. The system memory 903 can include random access memory (RAM), read only memory, flash memory, or any other suitable memory systems.

The computer system 900 comprises an input/output (I/O) adapter 906 and a communications adapter 907 coupled to the system bus 902. The I/O adapter 906 may be a small computer system interface (SCSI) adapter that communicates with a hard disk 908 and/or any other similar component. The I/O adapter 906 and the hard disk 908 are collectively referred to herein as a mass storage 910.

Software 911 for execution on the computer system 900 may be stored in the mass storage 910. The mass storage 910 is an example of a tangible storage medium readable by the processors 901, where the software 911 is stored as instructions for execution by the processors 901 to cause the computer system 900 to operate, such as is described herein below with respect to the various Figures. Examples of computer program product and the execution of such instruction is discussed herein in more detail. The communications adapter 907 interconnects the system bus 902 with a network 912, which may be an outside network, enabling the computer system 900 to communicate with other such systems. In one embodiment, a portion of the system memory 903 and the mass storage 910 collectively store an operating system, which may be any appropriate operating system, such as the z/OS or AIX operating system from IBM Corporation, to coordinate the functions of the various components shown in FIG. 9.

Additional input/output devices are shown as connected to the system bus 902 via a display adapter 915 and an interface adapter 916 and. In one embodiment, the adapters 906, 907, 915, and 916 may be connected to one or more I/O buses that are connected to the system bus 902 via an intermediate bus bridge (not shown). A display 919 (e.g., a screen or a display monitor) is connected to the system bus 902 by a display adapter 915, which may include a graphics controller to improve the performance of graphics intensive applications and a video controller. A keyboard 921, a mouse 922, a speaker 923, etc. can be interconnected to the system bus 902 via the interface adapter 916, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 9, the computer system 900 includes processing capability in the form of the processors 901, and, storage capability including the system memory 903 and the mass storage 910, input means such as the keyboard 921 and the mouse 922, and output capability including the speaker 923 and the display 919.

In some embodiments, the communications adapter 907 can transmit data using any suitable interface or protocol, such as the internet small computer system interface, among others. The network 912 may be a cellular network, a radio network, a wide area network (WAN), a local area network (LAN), or the Internet, among others. An external computing device may connect to the computer system 900 through the network 912. In some examples, an external computing device may be an external webserver or a cloud computing node.

It is to be understood that the block diagram of FIG. 9 is not intended to indicate that the computer system 900 is to include all of the components shown in FIG. 9. Rather, the computer system 900 can include any appropriate fewer or additional components not illustrated in FIG. 9 (e.g., additional memory components, embedded controllers, modules, additional network interfaces, etc.). Further, the embodiments described herein with respect to computer system 900 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source-code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

What is claimed is:

1. A method for dynamic content filtering, the method comprising:
   accessing, by a processing unit, a media content that comprises a plurality of content portions;
   determining, by the processing unit, a rating tag associated with each content portion from the media content;
   updating, by an administrator, a first rating tag of a first content portion from the media content with a new rating tag;
   storing, by the processing unit, the new rating tag for the first content portion in a first user profile of a user, the first user profile of the user comprising a permission level for the user and the new rating tag;
   based on a determination, by the processing unit, that the user with the first user profile is requesting the media content to be rendered:
   filtering, by the processing unit, the plurality of content portions from the media content based on the permission level, wherein, in response to the new rating tag of the first content portion exceeding the permission level in the first user profile, filtering out the first content portion; and rendering, by the processing unit, content portions of the plurality of content portions that were not filtered out by the filtering.

2. The method of claim 1, wherein the user is first user and the permission profile is a first permission level, and in response to a second user profile of a second user having a second permission level that exceeds the rating tag of the first content portion, rendering the first content portion.

3. The method of claim 1, wherein the administrator is associated with a master user profile that does not bypass rendering of any content portions from the media content.

4. The method of claim 1, wherein determining the rating tag further comprises:

assigning rating tags to each content portion in the media content by automatically scanning the media content using machine learning.

5. The method of claim 4, wherein the rating tags are determined and assigned in real-time while accessing the media content.

6. The method of claim 1, wherein the rating tags are assigned to the plurality of content portions by a content provider.

7. The method of claim 1, wherein in response to the first content portion being associated with an empty/blank rating tag, filtering out the first content portion.

8. A system comprising:
a content rendering device; and
a content server;
wherein, the system is configured to perform a method comprising:
    accessing, by the content rendering device, a media content from the content server, the media content comprising a plurality of content portions;
    determining, by the content rendering device, a rating tag associated with each content portion from the media content;
    determining, by the content rendering device, a user profile of a user requesting the media content to be rendered, the user profile comprising a permission level for the user and a new rating tag for a first content portion from the media content, the new rating tag assigned by an administrator specifically for the user;
    filtering, by the content rendering device, the plurality of content portions from the media content based on the permission level, wherein, in response to the new rating tag of the first content portion exceeding the permission level in the user profile, filtering out the first content portion; and
    rendering, by the processing unit, content portions of the plurality of content portions that were not filtered out by the filtering.

9. The system of claim 8, wherein the user is first user and the permission level is a first permission level, and in response to a second user profile of a second user having a second permission level that exceeds the rating tag of the first content portion, rendering the first content portion.

10. The system of claim 8, wherein the administrator is associated with a master user profile that does not bypass rendering of any content portions from the media content.

11. The system of claim 8, wherein determining the rating tag further comprises:

assigning rating tags to each content portion in the media content by automatically scanning the media content using machine learning.

12. The system of claim 11, wherein the rating tags are determined and assigned in real-time while accessing the media content.

13. The system of claim 8, wherein the rating tags are assigned to the plurality of content portions by a content provider.

14. The system of claim 8, wherein in response to the first content portion not being associated with a rating tag, filtering out the first content portion.

15. A computer program product comprising a memory storage device having computer executable instructions stored thereon, the computer executable instructions when executed by one or more processing units cause the one of more processing units to perform a method for censoring portions of media, the method comprising:

accessing a media content from a content server, the media content comprising a plurality of content portions;

determining a rating tag associated with each content portion from the media content;

determining a user profile of a user requesting the media content to be rendered, the user profile comprising a permission level for the user and a new rating tag for a first content portion from the media content, the new rating tag assigned by an administrator specifically for the user;

filtering, by the content rendering device, the plurality of content portions from the media content based on the permission level, wherein, in response to the new rating tag of the first content portion exceeding the permission level in the user profile, filtering out the first content portion; and rendering the plurality of content portions of the plurality of content portions that were not filtered out by the filtering.

16. The computer program product of claim 15, wherein the user is first user and the permission level is a first permission level, and in response to a second user profile of a second user having a second permission level that exceeds the rating tag of the first content portion, rendering the first content portion.

17. The computer program product of claim 15, wherein the administrator is associated with a master user profile that does not bypass rendering of any content portions from the media content.

18. The computer program product of claim 15, wherein determining the rating tag further comprises:

assigning rating tags to each content portion in the media content by automatically scanning the media content using machine learning.

19. The computer program product of claim 15, wherein the rating tags are assigned to the plurality of content portions by a content provider.

20. The computer program product of claim 15, wherein in response to the first content portion not being associated with a rating tag, filtering out the first content portion.

* * * * *